W. F. WAGNER.
LIQUID DISPENSER.
APPLICATION FILED AUG. 16, 1920.
1,404,670.
Patented Jan. 24, 1922.
3 SHEETS—SHEET 1.
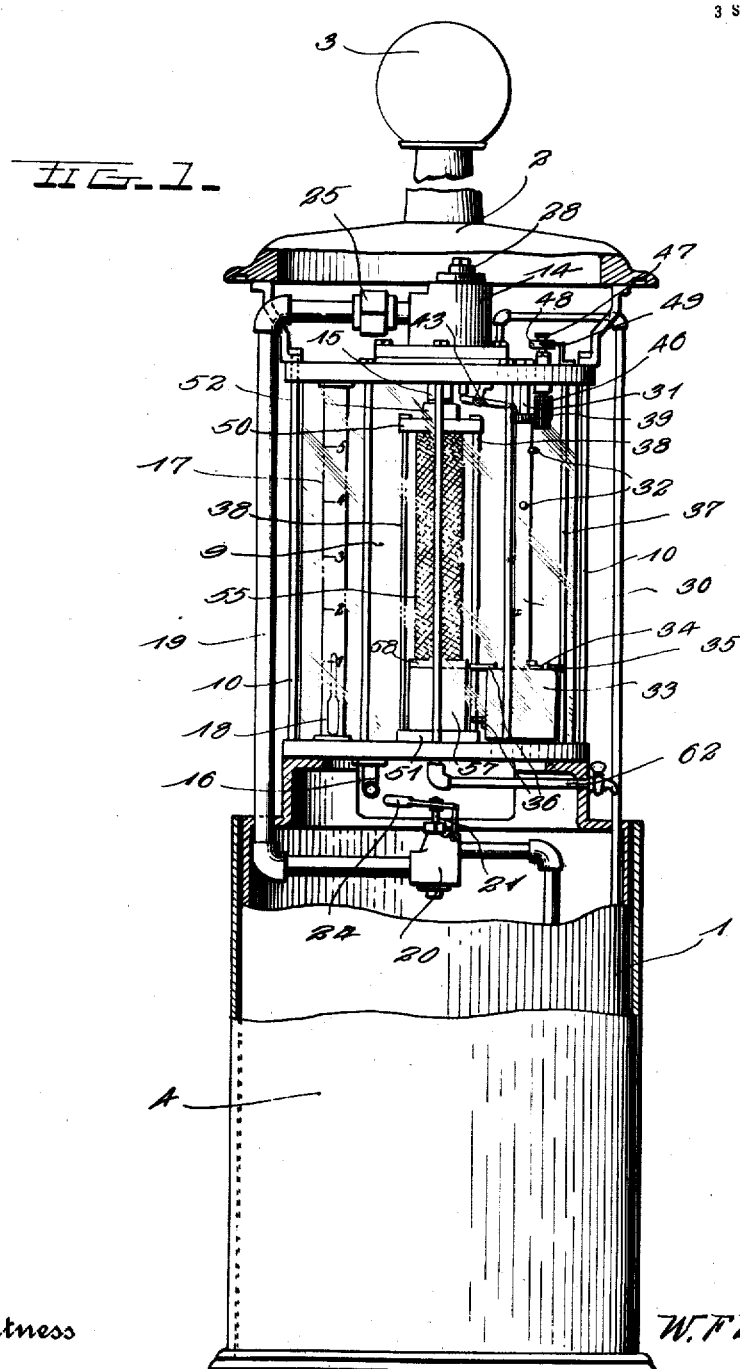
Witness
Inventor
W. F. Wagner
Attorneys

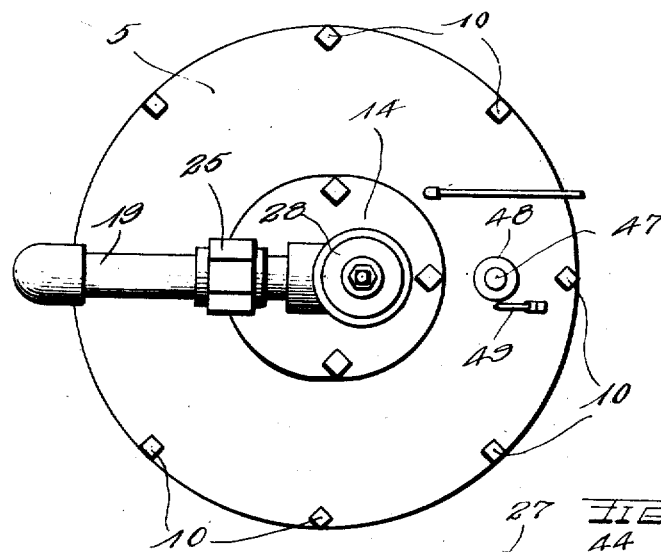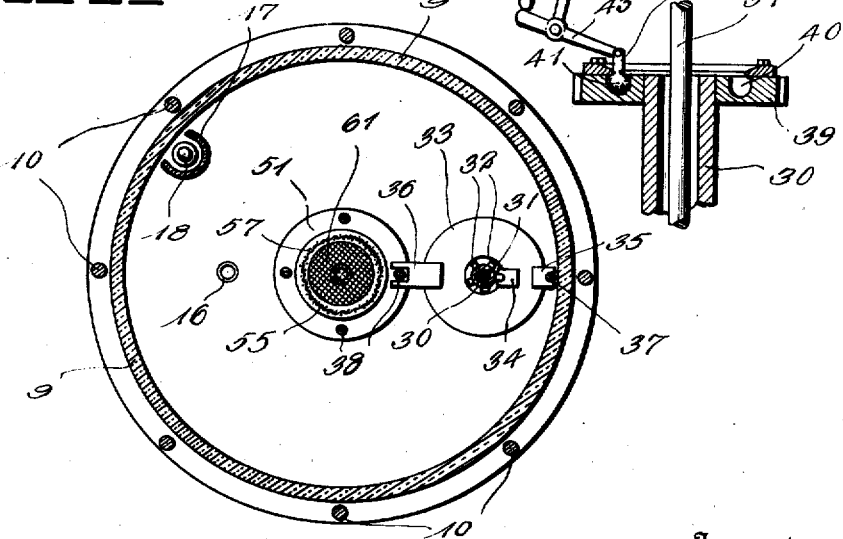

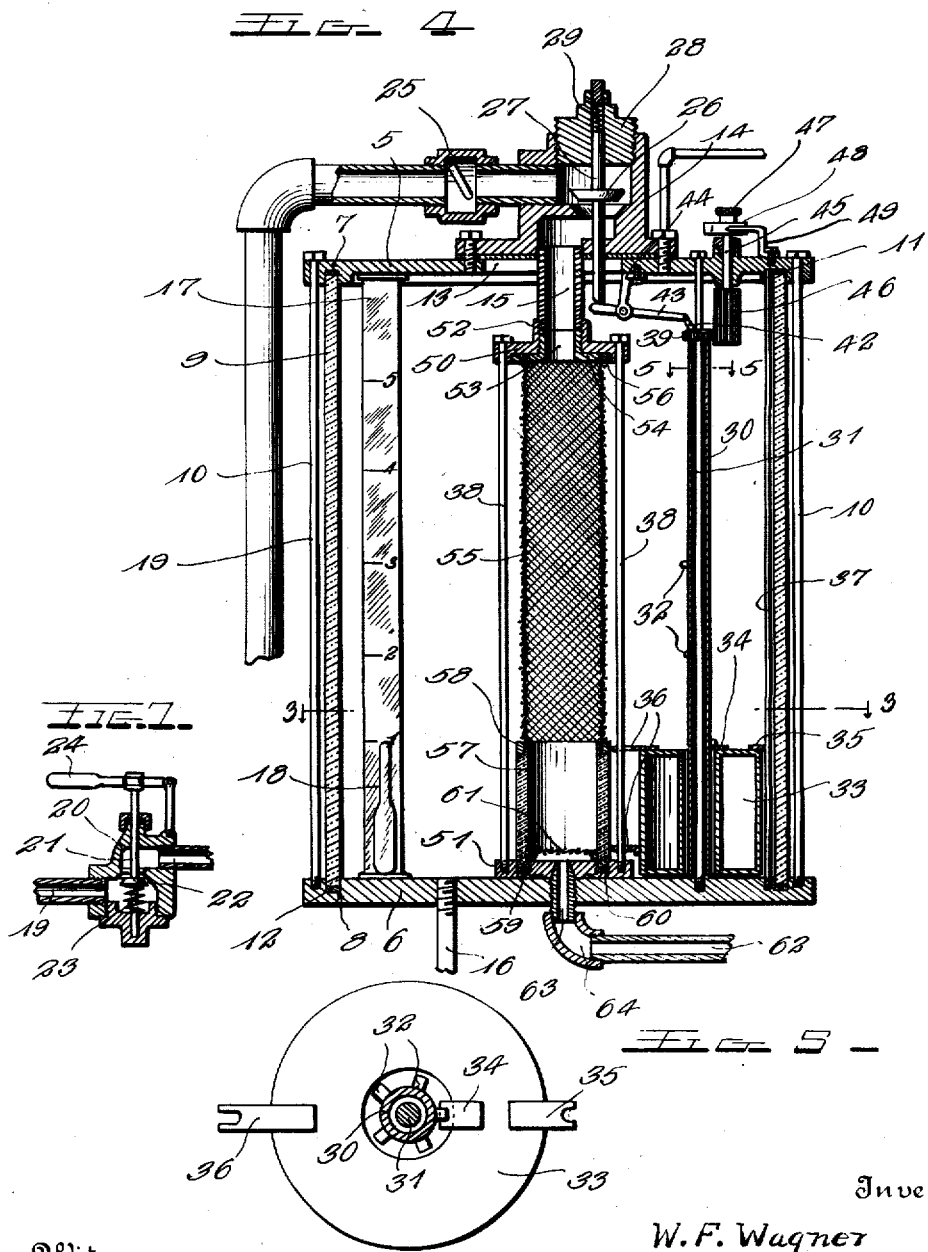

UNITED STATES PATENT OFFICE.

WILLIAM F. WAGNER, OF WILMINGTON, NORTH CAROLINA.

LIQUID DISPENSER.

1,404,670.  Specification of Letters Patent.  Patented Jan. 24, 1922.

Application filed August 16, 1920. Serial No. 403,729.

*To all whom it may concern:*

Be it known that I, WILLIAM F. WAGNER, a citizen of the United States, residing at Wilmington, in the county of New Hanover and State of North Carolina, have invented certain new and useful Improvements in Liquid Dispensers; and I do declare the following to be a full, clear, and exact description of the invention, such as will enable others skilled in the art to which it appertains to make and use the same.

This invention relates to an improved liquid dispenser for use in connection with the sale of gasoline and other similar liquids where it is desired to permit a certain amount of the liquid to flow into the receptacle forming part of the dispenser and cause the flow of liquid into the receptacle to be cut off when the desired amount of liquid has entered the receptacle.

One object of the invention is to so construct the dispensing device that the mechanism for causing the valve to close may be adjusted so that the valve will close when a predetermined amount of liquid has entered the receptacle.

Another object of the invention is to so construct this valve actuating mechanism that it may be operated by a float slidably mounted upon a sleeve and to further provide means for turning the sleeve so that a desired abutment may be engaged by the float according to the amount of liquid it is desired to have enter the receptacle.

Another object of the invention is to provide an improved type of strainer for straining the gasoline or other fluid entering the receptacle and thus prevent sediment from passing out of the receptacle when emptied.

Another object of the invention is to so construct the receptacle that a drain pipe may enter a cup provided at the bottom of the strainer for drawing off a small amount of liquid having the sediment contained therein.

Another object of the invention is to so construct the receptacle that a visible gauge may be provided, the receptacle, strainer cup and gauge tube being formed of glass so that the contents of the receptacle may be viewed.

Another object of the invention is to so construct this dispensing device that one of the rods serving to retain the strainer in a set-up position, may also serve as a guide rod for the float forming part of the valve actuating mechanism.

Another object of the invention is to provide a dispensing device so constructed that it may be readily taken apart when necessary for cleaning or repair purposes but which is further so constructed that it will be securely held in a set-up position when in use.

This invention is illustrated in the accompanying drawings, wherein:

Figure 1 is a view showing the improved dispensing device in position for use,

Fgure 2 is a top plan view of the receptacle,

Figure 3 is a transverse sectional view through the receptacle taken along the line 3—3 of Fig. 4, Figure 4 is a vertical sectional view through the receptacle, Figure 5 is a transverse sectional view taken along the line 5—5 of Figure 4, and Figure 6 is a fragmentary sectional view showing the connection of the valve actuating lever with the gear of the float carrying sleeve, Figure 7 is a detail view of the valve for the feed pipe.

This improved dispensing device is provided with a receptacle which is mounted upon the pedestal 1, the pedestal having an upper section 2 upon which a light 3 for advertising purposes may be mounted. A closure 4 is provided so that when not in use, this closure may be secured and thus the liquid dispensing device prevented from being tampered with by unauthorized persons.

The receptacle which is carried by the stand as shown in Fig. 1 is provided with an upper head 5 and a lower head 6 which are provided with grooves 7 and 8 to receive the upper and lower end portions of a cylindrical wall 9 formed of glass or other transparent material so that the interior of the receptacle may be seen. Bolts 10 extend through openings in the upper head 5 and have their lower ends screwed into threaded sockets formed in the lower head so that the two heads may be drawn into tight engagement with the transparent body 9 of the receptacle. Packing rings 11 and 12 are placed in the seats 7 and 8 and will be compressed when the bolts are tightened thus forming a tight joint to prevent leakage.

The upper head is provided with an opening 13 covered by a valve housing 14 from which extends a nipple 15 so that the gasoline may pass into the receptacle. A draw-off pipe 16 extends through the lower head and will be connected with a suitable hose thus permitting the gasoline to be fed into the tank of an automobile. It is desired to provide a visible gauge so that the height of the gasoline in the receptacle may be readily ascertained and therefore there has been provided a tube 17 which extends vertically in the receptacle and contains a float 18 which will move upwardly in the tube as the receptacle fills with the liquid. Therefore, the height of the liquid in the receptacle can be readily ascertained. From an inspection of Fig. 3, it will be seen that the tube 17 is open at one side and terminates a short distance from the wall of the receptacle thus providing space to permit the liquid to enter the tube.

The pipe 19 which leads from a suitable reservoir is provided with a valve 20 including a stem 21 and valve head 22 normally held in a closed position by the springs 23. An actuating handle or lever 24 is provided and is connected with the stem 21 so that when it is desired to have the gasoline pass into the receptacle, the stem may be moved to open the valve 20 and permit the gasoline to flow through the pipe 19 past the check valve 25 and through the valve 14 into the nipple 15. This valve 14 is provided with a valve head 26 which is carried by a stem 27 slidably mounted in the valve housing with its upper end extending into an opening formed in a plug 28 and engaged by a spring 29. The spring 29 will normally move the stem 27 downwardly and thus the valve 14 will normally be held in a closed position when the stem is relieved from pressure holding it in a raised position against action of the spring.

In order to permit the valve 14 to be held open against the action of the spring 29 and further in order to permit the valve 14 to be closed when a predetermined amount of gasoline has entered the receptacle, there has been provided a sleeve 30 which is slidably mounted upon a rod or stem 31 which passes through the upper head and is screwed into a threaded opening formed in the lower head of the receptacle. This sleeve is provided with abutment lugs 32 which are arranged in a spiral course about the sleeve as shown in Fig. 5. The lugs are so positioned that the distance between the lugs corresponds to the amount of space in the receptacle occupied by a given quantity of gasoline. A float 33 is loosely mounted upon the sleeve 30 and provided with an abutment strip 34 for engaging the abutment lugs 32 and this float is provided with guide strips 35 and 36, one of which engages a rod 37 extending vertically in the receptacle near the wall thereof. The second strip engages one of the bolts 38 which form part of a filter to be hereinafter described, and therefore the float will be held against rotary movement but will be permitted to have vertical sliding movement. By having the sleeve rotatable as well as slidable, the sleeve may be turned to bring a desired lug 32 into position for engagement by the abutment strip 34 and the float may be permitted to move upwardly a desired extent before the strip 34 engages a lug and causes the sleeve to be moved upwardly with the float. This sleeve carries at its upper end a gear 39 having in its upper face a groove 40 in which will be positioned a ball 41 having a stem 42 extending therefrom and connected with a lever 43 pivotally mounted upon the bracket 44 and engaging the lower end of the valve stem 27. It will thus be seen that the sleeve 30 will act as a weight to normally swing the lever to the position of Fig. 4 and thus move the stem 27 upwardly and open the valve. When the float engages one of the lugs 32 and moves the sleeve upwardly, pressure will be removed from the stem 27 and the spring 29 can then move the valve to a closed position to cut off the flow of gasoline through the valve 14. In order to permit the sleeve to be turned, there has been provided a stem 45 which is journaled in the upper head 5 and is provided at its lower end with an elongated gear or pinion 46 meshing with the pinion 39. At the upper end of this stem 45 there has been provided a turning head 47 which includes a dial 48 having indicating marks thereon. By turning the stem so that the desired mark of the dial is in the proper relation to the pointer 49, the sleeve may be turned to bring the desired lug into position for engagement by the abutment of the float and therefore the sleeve will not be moved upwardly to permit the valve 14 to be closed until the receptacle has been filled with the desired amount of gasoline.

It is desired to have the gasoline filtered and all sediment removed from the same, and there has therefore been provided a filter having an upper head 50 and a lower head 51, the bolts 38 being passed through the upper head and screwed into threaded sockets formed in the lower head. The nipple 15 is screwed into the neck 52 of the upper head and engages a bushing 53 which is screwed into the neck 52. This bushing is provided at its lower end with an outstanding collar 54 which fits into and a holds the upper end portion of a tubular screen 55 in tight engagement with a packing ring 56 in the upper head. The lower end of this tubular screen 55 is connected with a sleeve or cup 57 which is formed of glass or other transparent material, the screen being connected with this cup by means of a securing ring 58 screwed upon the upper end of the cup. The cup fits into a groove 59 formed in the lower head 51 and rests upon a packing ring 60 to provide a tight joint. A screen 61 is provided in the lower portion of the cup so that sediment will be retained in this cup and prevented from passing out of the same with gasoline when the cup is drained. In order to drain this cup, there has been provided a pipe 62 which is connected with a nipple 63 by an elbow 64, the nipple extending through the lower head 6 and having a tapered upper end fitting into an opening formed in the lower head 51 of the filter.

When this device is in use, it is set up as shown in Fig. 1 and when it is desired to dispense a certain quantity of gasoline, the stem 45 will be rotated by means of the head 47 until the number corresponding to the amount of gasoline desired is in operative relation to the pointer 49. This will position the desired lugs 32 above the abutment strip or plate 34. The valve 20 will then be opened and the gasoline will flow through the pipe 19 and through the valve 14 into the filter. The gasoline will pass out of the filter and the receptacle will be partially or wholly filled with the gasoline. As the gasoline fills the receptacle, the float will be moved upwardly until the abutment plate 34 engages the lug 32 positioned above the plate. As soon as the plate engages the lugs, the sleeve will be carried upwardly and the lever 43 will be moved upon its pivot thus releasing pressure from the valve stem 27 and permitting the spring 29 to move the valve to a closed position. The flow of gasoline will be thus cut off automatically when a desired amount has entered the receptacle. The valve 20 will then be closed and the gasoline permitted to pass out through the outlet pipe 16. As soon as the gasoline passes out of the receptacle, the float will return to the original position and the sleeve will act as a weight to open the valve 26.

It will thus be seen that there has been provided a gasoline dispenser which is so constructed that the flow of gasoline into the receptacle will be cut off when a predetermined amount has entered the receptacle. It will be further seen that the gasoline may be viewed through the receptacle which is formed of glass and further that the float 18 will assist in readily ascertaining the amount of gasoline in the receptacle. It will also be noted that the device is so constructed that it can be readily taken apart for cleaning or repair, as it is only necessary to remove the vertically extending bolts in order to disconnect the parts forming the device.

I claim:

1. A liquid dispensing device comprising a receptacle having upper and lower heads, an outlet pipe extending through the lower head, a drain pipe extending through the lower head, an inlet valve closing an opening in the upper head, a tubular strainer in the receptacle having a lower head receiving said drain pipe and an upper head having an inlet opening, a nipple leading from the inlet of the upper strainer head and connecting the strainer with the inlet valve, and means for opening said valve.

2. A liquid dispensing device comprising a receptacle having upper and lower heads, a drain pipe extending through the lower head, a valve housing covering an opening in the upper head, a valve in the housing having a stem extending into the receptacle, a tubular strainer having a lower head receiving the inner end of the drain pipe and an upper head, a nipple connecting the upper head with said valve housing, and means for engaging the valve stem to move the valve to a closed position.

3. A liquid dispensing device comprising a receptacle having an inlet and an outlet, a valve for the inlet, a strainer having upper and lower heads, a sleeve carried by the lower head, a tube of screening extending between and connected with the sleeve and upper head, a nipple connecting the upper head with said valve, and a drain pipe extending into the receptacle and through the lower head.

4. A liquid dispensing device comprising a transparent receptacle having an outlet and a valve controlled inlet, a filter positioned vertically in the receptacle and having its upper end connected with the valve controlled inlet and having at its lower end a transparent sediment cup, a drain pipe extending through the bottom of the receptacle and into an opening in the bottom of the sediment cup, a visible gauge in said receptacle, and means for causing closing of the inlet valve upon a predetermined quantity of liquid entering the receptacle.

In testimony whereof I have hereunto set my hand in the presence of a subscribing witness.

WILLIAM F. WAGNER.

Witness:
Thos. H. Wright.